United States Patent [19]

Goldenberg

[11] Patent Number: 4,649,270

[45] Date of Patent: Mar. 10, 1987

[54] PHOTO-ELECTRIC OBJECT DETECTOR HAVING REMOVABLE FIELD STOP MEANS

[76] Inventor: Louis Goldenberg, 22 Middlesex Cir., Waltham, Mass. 02154

[21] Appl. No.: 680,093

[22] Filed: Dec. 10, 1984

[51] Int. Cl.[4] .......................... G01V 9/04; G06M 7/00; H01J 40/14
[52] U.S. Cl. ................................ 250/221; 250/237 R; 340/556
[58] Field of Search .................. 250/221, 222.1, 222.2, 250/237 R; 340/555, 556, 557; 350/319; 354/270

[56] References Cited

U.S. PATENT DOCUMENTS

| | | | |
|---|---|---|---|
| 3,825,747 | 7/1974 | Thomson | 250/222.1 |
| 4,029,957 | 6/1977 | Betz et al. | 250/221 |
| 4,306,147 | 12/1981 | Fukuyama et al. | 250/221 |
| 4,335,316 | 6/1982 | Glanz et al. | 250/221 |
| 4,507,557 | 3/1985 | Tsikos | 250/221 |

*Primary Examiner*—David C. Nelms
*Assistant Examiner*—William L. Oen
*Attorney, Agent, or Firm*—Robert L. Nathans

[57] ABSTRACT

A pulsed LED photoelectric control apparatus operates in both the proximity mode and the retro-reflective mode. Field stop elements are manually inserted for operation in the retro-reflective mode and are quickly and readily removed for operation in the proximity mode in order to enable the same photo-electric control apparatus to be utilized in both modes.

11 Claims, 2 Drawing Figures

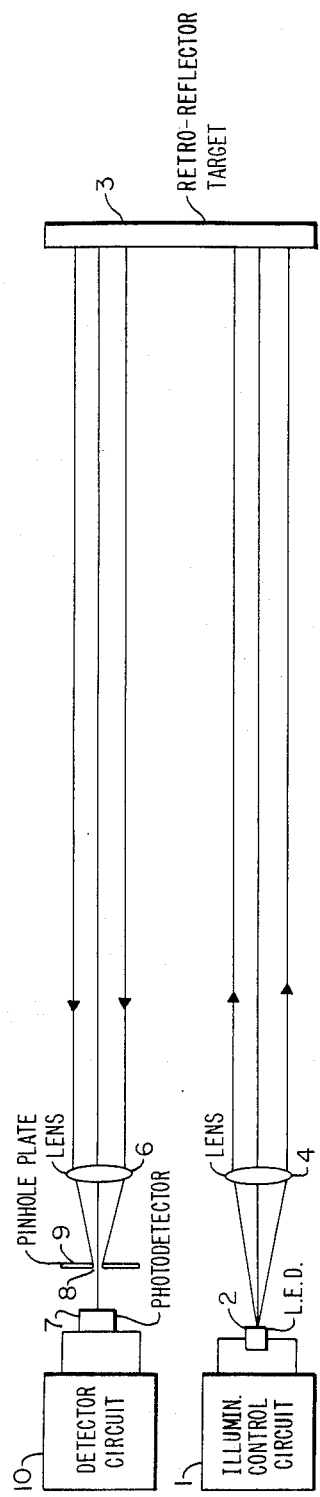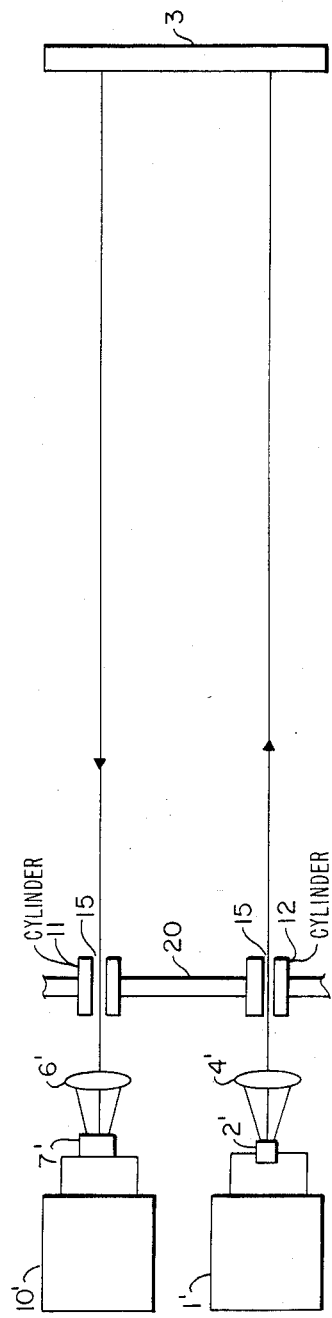

PHOTO-ELECTRIC OBJECT DETECTOR HAVING REMOVABLE FIELD STOP MEANS

BACKGROUND OF THE INVENTION

Photo-electric control devices have been marketed for many years for performing various functions such as, for example, counting objects which pass by an inspection station positioned adjacent to an assembly line. In one mode of operation, pulsed beams of light are transmitted by the photo-electric control and the presence of the object is indicated by return beams reflected off of the object and detected by a photodetector in the control. This mode of opeation is designated as the proximity range mode.

In a second mode of operation, a retro-reflective target is positioned so that the objects to be detected pass between the target and the photo-electric control. Such a target will redirect transmitted light, in a direction parallel to such transmitted light. The light rebounded from the retro-reflector is sensed by the photo-electric control. In contrast with operation in the proximity mode, the retro-reflective mode will cause light to be detected upon the absence of an object. Since rebounded light is detected within a relatively wide angle in the proximity mode, and within a relatively narrow angle in the retro-reflective mode, separate photo-electric controls have been provided in the marketplace for many years to accommodate the two modes of operation. The provision of separate apparatus for this purpose is wasteful, and it is thus an object of my invention to provide a method and apparatus for facilitating operation of basically the same photoelectric control device in both modes.

It is a further object of one embodiment of my invention to eliminate potential alignment problems with respect to the positioning of the photodetector relative to the optical axis of the light detector portion of the control device.

SUMMARY OF THE INVENTION

In accordance with one method of the present invention, a readily removable field stop element is positioned in front of the light detector for providing operation in the retro-reflector mode, and is manually removed for operation in the proximity mode, in order to permit virtually the same photoelectric control device to operate in both modes. The field stop element may comprise a light blocking plate having a pinhole therein.

Other objects, features and advantages of the present invention will become apparent upon study of the following specific description taken in conjunction with the drawings in which:

FIG. 1 illustrates apparatus employing a field stop element utilizing a pinhole;

FIG. 2 illustrates apparatus employing readily removable cylindrical field stop elements.

SPECIFIC DESCRIPTION

Referring now to FIG. 1, an illumination control circuit 1 is coupled to light emitting diode 2, which constitutes a light generator for projecting light upon retro-reflective target 3 via a collimating lens 4. Target 3 redirects the light beam back parallel to itself and lens 6 focuses the light beam upon pinhole 8 of manually removable pinhole plate 9. In order to eliminate the effect of changing ambient lighting conditions, illumination control circuit 1 sequentially pulses LED 2, while light detector circuitry 10, coupled to large area photodetector 7, includes an amplifier tuned to the pulsing frequency of the light pulses produced by LED 2. In the proximity mode of operation, the pinhole plate 9 is manually removed, and the presence of an object is detected by light rebounded from the object, and the presence of the object is indicated by electrical signals generated by photodetector 7.

In the retro-reflective mode, the pinhole plate is manually inserted into position and permits light to pass through the pinhole of the plate, which is returned by retro-reflector 3 only through a narrow angle of view. The light being directed at the photoelectric control apparatus from objects outside of the narrow angle field of view will not pass through the pinhole plate owing to focusing lens 6. However photodetector 7 is advantageously of the large area type so that any slight misalignment of the detector 7 with respect to the pinhole due to manufacturing tolerances, will not adversely affect operation of the apparatus, and will detect sufficient light flux to produce a good signal in both modes.

Thus in accordance with the invention, pinhole plate 9 may be easily and quickly manually inserted for operation in the retro-reflective mode, and manually removed for operation in the proximity mode, thereby to effect the economies mentioned above.

In accordance with the arrangement of FIG. 2, the above stated functions are performed by removable cylindrical field stop elements 11 and 12 which, in the retro-reflective mode, are manually positioned within support member 20 as indicated in FIG. 2, and removed upon operation in the proximity mode. The elongated cylindrical elements of FIG. 2 preferably comprise cylindrical rods, having light transmitting circular apertures 15, concentric with the optical axes or longitudinal axes of the cylinders, indicated in FIG. 2. Thus cylindrical field stop elements 11 and 12 are quickly and easily fitted manually into sockets within the control devices for operation in the retro-reflective mode, and are quickly manually removed for operation in the proximity mode. The remaining primed number elements are similar to the numbered elements of FIG. 1.

The pinhole plate in the inventor's product has a length of 0.26 inches, a width of 0.11 inches and a pinhole aperture having a diameter of 0.03 inches.

While the invention may be practiced as specified, obviously variations may be made by the worker in the art, and thus the scope of the invention is to be limited only by the language of the following claims and equivalents thereof. For example, the term aperture need not be a physical hole but could be a light-transmissive portion of an opaque plastic body.

I claim:

1. Method of eliminating duplication of photo-electric control apparatus for functioning in a retro-reflective mode wherein detected light is reflected off of a retro-reflector and a proximity mode wherein detected light is reflected off of an object comprising the steps of:
    a. providing a photoelectric control device having a light beam transmission means, including a light generator, for projecting a light beam on said retro-reflector, light detector means for producing a signal upon the reception of said light beam reflected off of said retro-reflector together with a readily removable field stop means positioned in front of said light detector for detecting light only from a narrow field of view including said retro-reflector;
b. manually positioning said field stop means in front of said detector for operation in said retro-reflector mode; and
c. manually removing said field stop means for operation in said proximity mode.

2. The method of claim 1 wherein said field stop means is an elongated element having a longitudinal axis and a light transmitting aperture formed therein along said longitudinal axis.

3. The method of claim 1 wherein said removable field stop means is a plate having a pinhole formed therein.

4. Photo-electric control apparatus for eliminating duplication of elements and for functioning in both a retro-reflective mode wherein light is reflected off of a retro-reflector and detected, and in a proximity mode wherein light is reflected off of an object comprising:
a. light beam transmission means including a light generator for projecting a substantially collimated light beam on said retro-reflector;
b. a photodetector for producing a signal upon the reception of said beam; and
manually removable field stop means, having a light transmitting aperture of a particular size positioned in front of said photodetector for detecting light only from a narrow field of view including said retro-reflector when in retro-reflective mode and field stop means removed when in the proximity mode.

5. The apparatus of claim 4 wherein said field stop means is an elongated element having a light transmitting aperture formed therein along the length thereof.

6. The apparatus of claim 4 wherein said removable field stop means is a plate having a pinhole formed therein.

7. The apparatus of claim 5 wherein said elongated element is cylindrical, has a longitudinal axis and has said light transmitting aperture formed therein concentric with said longitudinal axis.

8. The apparatus of claim 4 wherein said photodetector has an area larger than the size of said aperture to minimize alignment problems and produce a substantial electrical signal in said proximity mode.

9. The apparatus of claim 5 wherein said photodetector has an area larger than the size of said aperture to minimize alignment problems and produce a substantial electrical signal in said proximity mode.

10. The apparatus of claim 6 wherein said photodetector has an area larger than the size of said aperture to minimize alignment problems and produce a substantial electrical signal in said proximity mode.

11. The apparatus of claim 7 wherein said photodetector has an area larger than the size of said aperture to minimize alignment problems and produce a substantial electrical signal in said proximity mode.

* * * * *